United States Patent [19]

Nakamura

[11] Patent Number: 5,546,567

[45] Date of Patent: Aug. 13, 1996

[54] SYSTEM FOR LIMITING CHANGE IN BUS CLOCK FREQUENCY TO DURATION OF I/O OPERATION UPON COMPLETION SIGNAL

[75] Inventor: Nobutaka Nakamura, Oome, Japan

[73] Assignee: Kabushiki Kaisha Toshiba, Kawasaki, Japan

[21] Appl. No.: 242,073

[22] Filed: May 13, 1994

Related U.S. Application Data

[63] Continuation of Ser. No. 921,612, Aug. 3, 1992, abandoned, which is a continuation of Ser. No. 405,887, Sep. 11, 1989, abandoned.

[30] Foreign Application Priority Data

Sep. 13, 1988 [JP] Japan .................. 63-229023

[51] Int. Cl.⁶ .................................................. G06F 1/14
[52] U.S. Cl. .......................... 395/550; 395/180; 395/821; 395/500
[58] Field of Search ........................... 395/275, 500, 395/550, 575, 180, 821

[56] References Cited

U.S. PATENT DOCUMENTS

| | | | |
|---|---|---|---|
| 4,095,267 | 6/1978 | Morimoto | 364/200 |
| 4,254,475 | 3/1981 | Cooney et al. | 364/900 |
| 4,366,540 | 12/1982 | Berglund et al. | 364/200 |
| 4,509,120 | 4/1985 | Daudelin | 364/200 |
| 4,578,782 | 3/1986 | Kraft et al. | 365/222 |
| 4,631,702 | 12/1986 | Korba . | |
| 4,754,425 | 6/1988 | Bhadriraju | 364/900 |
| 4,785,416 | 11/1988 | Stringer | 364/200 |
| 4,802,120 | 1/1989 | McCoy | 364/900 |
| 4,819,164 | 4/1989 | Branson | 364/200 |
| 4,821,229 | 4/1989 | Jauregui | 364/900 |
| 4,823,262 | 4/1989 | Calle | 364/200 |
| 4,825,364 | 4/1989 | Hyatt | 364/200 |
| 4,835,681 | 5/1989 | Culley | 364/200 |
| 4,893,271 | 1/1990 | Davis et al. | 364/900 |
| 4,924,381 | 5/1990 | Tokuume | 364/200 |
| 4,984,195 | 1/1991 | Nakamura et al. | 364/200 |
| 4,999,769 | 3/1991 | Costes et al. | 364/200 |
| 5,125,088 | 1/1992 | Culley | 395/500 |

*Primary Examiner*—Ken S. Kim
*Attorney, Agent, or Firm*—Finnegan, Henderson, Farabow, Garrett & Dunner, L.L.P.

[57] ABSTRACT

A computer system includes a program executing section for executing a program, an instruction generating section for generating a frequency change instruction in response to the execution of the program, and a changing section for changing the frequency of an operation clock of a system bus in reponse to the frequency change instruction. The frequency of the operation clock of the system bus is changed when an interface having a low operation rate is accessed. Therefore, an average speed of the system can remain high.

4 Claims, 6 Drawing Sheets

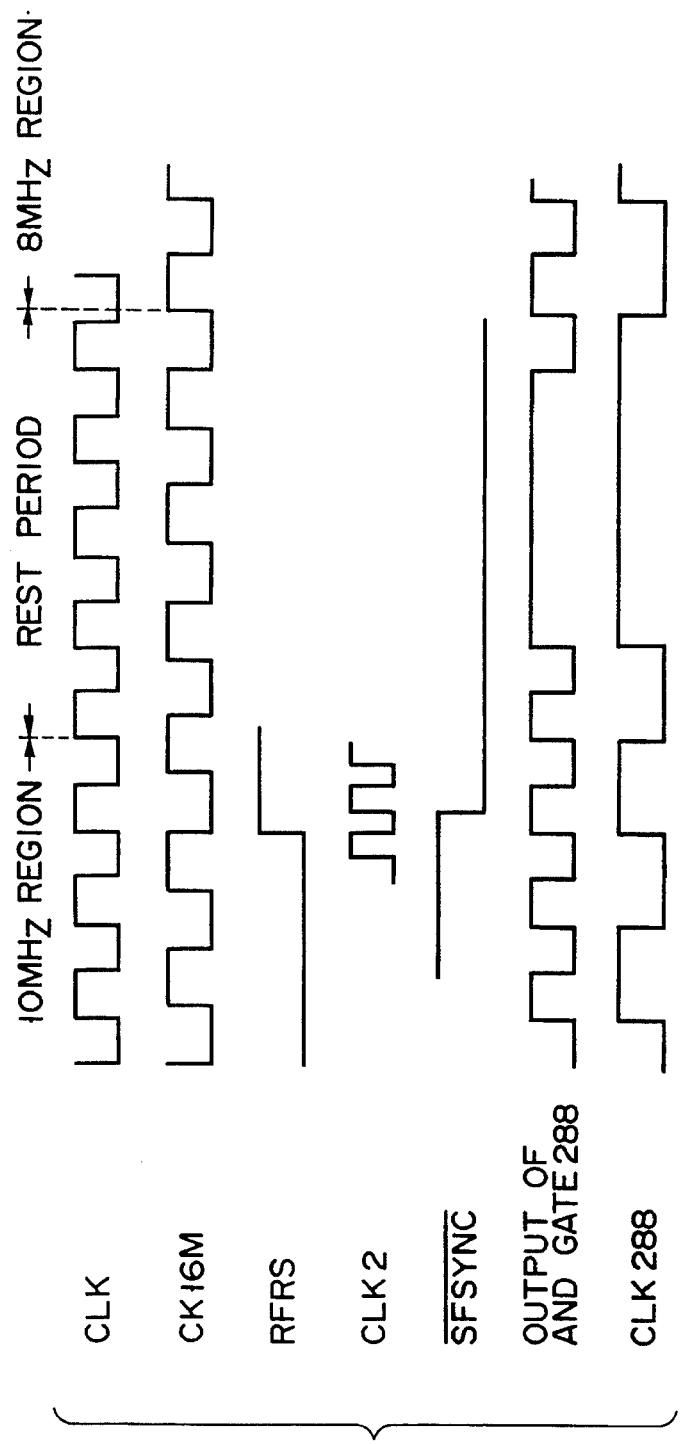

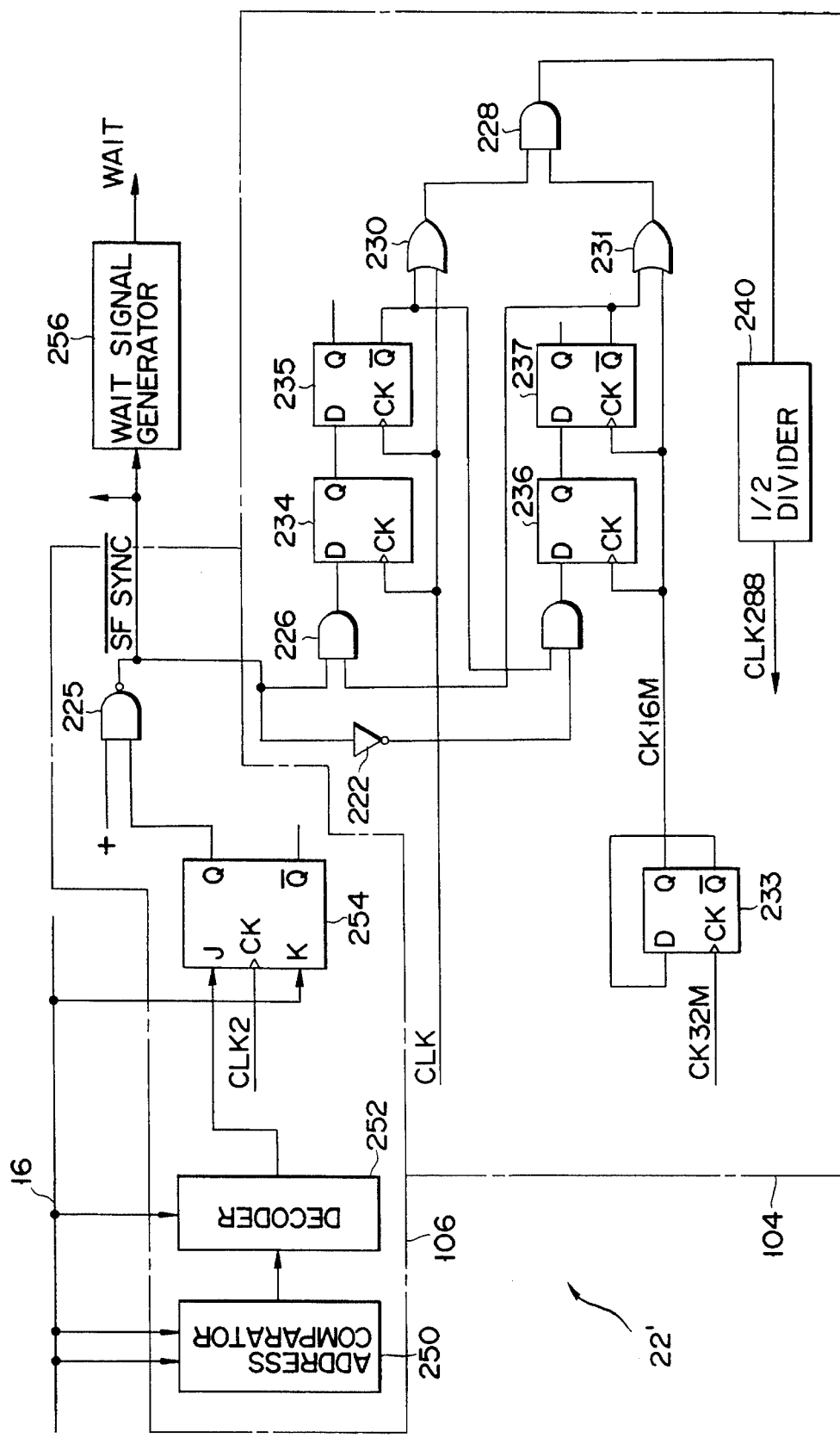
F I G. 7

SYSTEM FOR LIMITING CHANGE IN BUS CLOCK FREQUENCY TO DURATION OF I/O OPERATION UPON COMPLETION SIGNAL

This application is a continuation of application Ser. No. 07/921,612 filed Aug. 3, 1992, which is a continuation of application Ser. No. 07/405,887 filed Sep. 11, 1989, both now abandoned.

BACKGROUND OF THE INVENTION

1. Field of the Invention

This invention relates to a computer system and a method for changing the operation rate of a system bus.

2. Description of the Related Art

Recently, with the development of semiconductor technology, microprocessors, memories and peripheral control Large Scale Integrated Circuits ("LSI") can be supplied at extremely low cost. Computer systems of relatively high performance can be constructed by adequately combining the LSIs via system buses. To enhance the operation rate of such computer systems, the operation rate of the microprocessor, which is the nucleus of the computer system, is made even higher and the function thereof tends to be further enhanced.

However, the peripheral LSIs have been developed after the microprocessor was developed and, because there are many kinds of LSIs, it takes a longer time to develop the LSIs in general. Therefore, the operation rate of the system bus connected to the peripheral LSI has not been significantly improved. That is, in many cases, the operation rate of the system bus remains lower than that of the high-rate microprocessor so that the former cannot accommodate the high-rate of operation of the latter. Therefore, in the conventional computer system, the frequency of the operation clock of the microprocessor tends to be set to an integer multiple of the frequency of the operation clock of the system bus, in order to easily synchronize the operation clock of the system bus with that of the microprocessor.

Further, in order to inherit the property of software, the newly developed computer systems are required to be compatible with the conventional computer systems. Some software is designed with respect to hardware which is connected to a system bus which operates in response to the operation clock of a relatively low frequency. Therefore, in a case where such hardware is used in the computer system, it is necessary to effect data transfer when the operation rate of the microprocessor is set to correspond to that of the hardware. In this case, the function of the high-speed microprocessor cannot be fully utilized.

SUMMARY OF THE INVENTION

This invention has been made in consideration of the above, and an object of this invention is to provide a computer system and a method for changing the operation rate of a system bus.

In order to attain the above object, the computer system includes a program executing section for executing a program, an instruction generating section for generating a frequency change instruction in accordance with the execution of the program, and a changing section for changing the operation clock frequency of the system bus in response to the frequency change instruction.

In order to attain the above object, the method comprises the steps of executing a program, generating a frequency change instruction in accordance with the execution of the program by a processor, and changing the operation clock frequency of the system bus in response to the frequency change instruction.

As described above, according to the computer system of this invention, the operation clock frequency of the system bus can be set in a programmable fashion.

BRIEF DESCRIPTION OF THE DRAWINGS

FIG. 4 is a diagram showing the format of access control data stored in a register shown in FIG. 3;

FIG. 5 is a timing chart showing the operation of the first embodiment;

FIG. 7 is a block diagram showing the detail construction of that portion of a bus controller of FIG. 6 which relates to this invention.

DETAILED DESCRIPTION OF THE PREFERRED EMBODIMENTS

There will now be described a computer system according to this invention with reference to the accompanying drawings.

Figure 1:
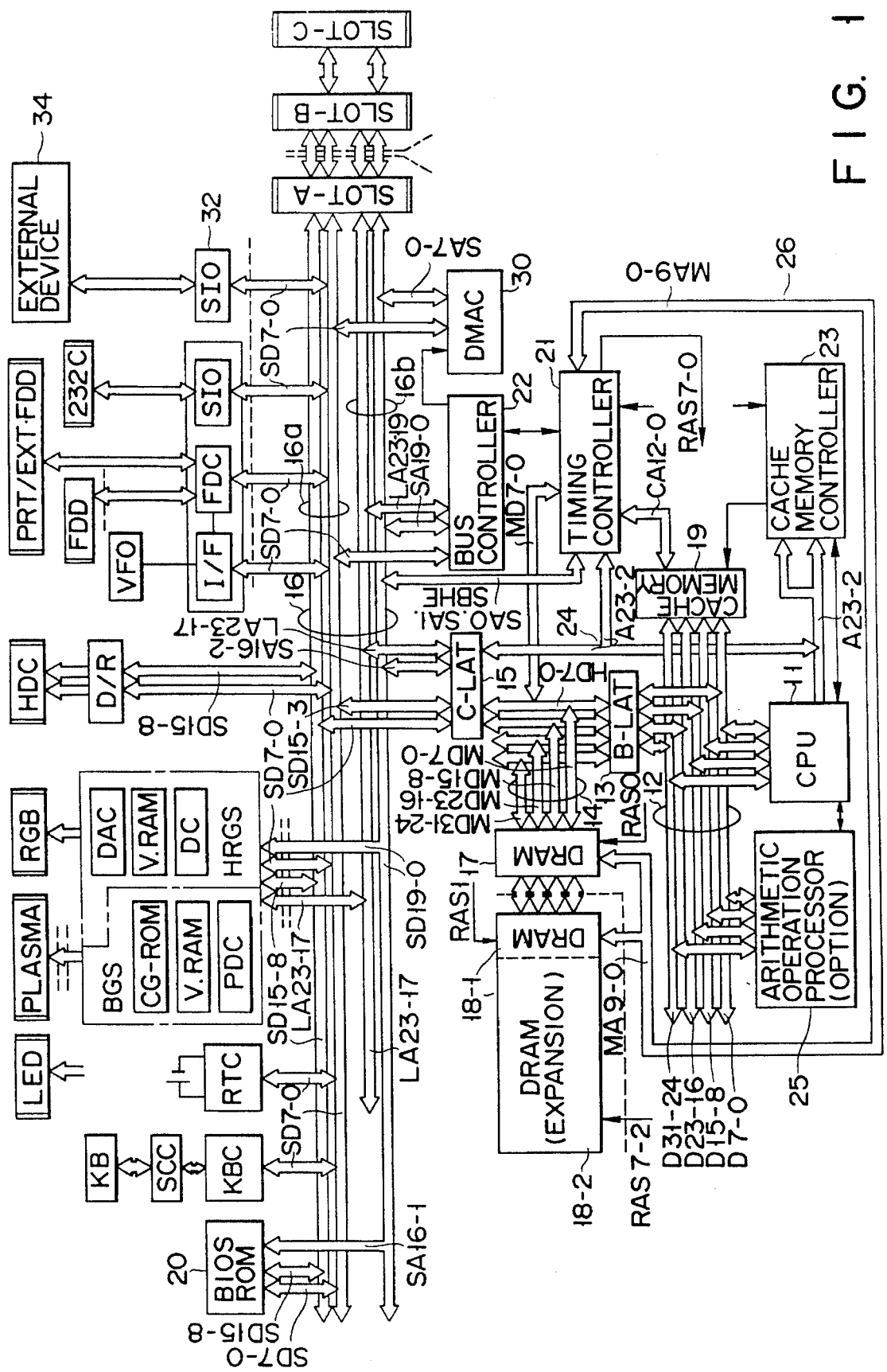
FIG. 1 is a block diagram showing the schematic construction of a computer system according to this invention.

In FIG. 1, a 32-bit CPU 11 is connected to a CPU bus including a CPU data bus (D31-0) 12 and a CPU address bus (A23-2) 24. The CPU 11 supplies an address to the CPU address bus 24, supplies data to the CPU data bus 12 and receives data from the CPU data bus 12. An optional arithmetic operation processor 25 is connected to the CPU data bus 12 and effects arithmetic operations according to the instructions from the CPU 11. A B latch (B-LAT) 13 functions to connect the CPU data bus 12 to a memory data bus (MD31-0) 14 according to a control signal from the timing controller 21. The CPU data bus 12 and the CPU address bus 24 are respectively connected to a cache memory 19 and a cache memory controller 23. Data is read out from the cache memory 19 without accessing memories (DRAM) 17, 18-1 and 18-2 when a cache hit has occurred.

The memory sections (DRAM) 17, 18-1 and 18-2 are connected to the memory data bus 14 and a memory address bus (MA9-0) 26. Further, control signals RAS0 to RAS7 are supplied to the memory sections 17, 18-1 and 18-2. Each of the memory sections 17 and 18-1 has a memory capacity of 1 MB and is provided as a standard memory. The memory section 18-2 is an expansion memory and can be used as expandable memory sections of the maximum memory capacity of 12 MB. The expandable memory sections are specified in units of 1 MB by the signals RAS2-7 and the address thereof is designated by column and row addresses of 10 bits supplied from the timing controller 21 via the memory address bus 26. The latch (C-LAT) 15 connects the memory data bus 14 and CPU address bus 24 to a system data bus 16a and a system address bus 16b of the system bus 16 respectively in response to the timing control signal from the bus controller 22.

The timing controller 21 is connected to the CPU address bus 24, the memory address bus 26, a part of the memory data bus 14, the system address bus 16b and cache address bus (CA12-0) and generates various timing control signals to control the operation of the computer system. More specifically, the timing controller 21 generates the timing control signal for controlling the B-LAT 13 in response to control data output from the CPU 11 onto a CPU control data bus (not shown) and a transfer control signal from the bus controller 22. Further, the timing controller 21 generates a memory address and a cache memory address. The cache memory address is supplied to the cache memory 19. A bus controller 22 connected to the system bus 16 is used to perform the control on the operation on the system bus 16. More specifically, the bus controller 22 generates the timing control signal for controlling the C-LAT 15 in response to control data on a system control data bus (not shown) of the system bus 16 and a transfer control signal from the timing controller 21.

A (Basic Input/Output System) (Randon Access Memory) 20 stores a program for controlling the data input/output operation, i.e., a basic input/output system program. An external device 34 is connected to the system bus 16 via a serial input/output interface (SIO) 32. In addition, various interfaces are connected to the system bus 16, but the explanation of those portions which do not relate to this invention is omitted.

Figure 2:
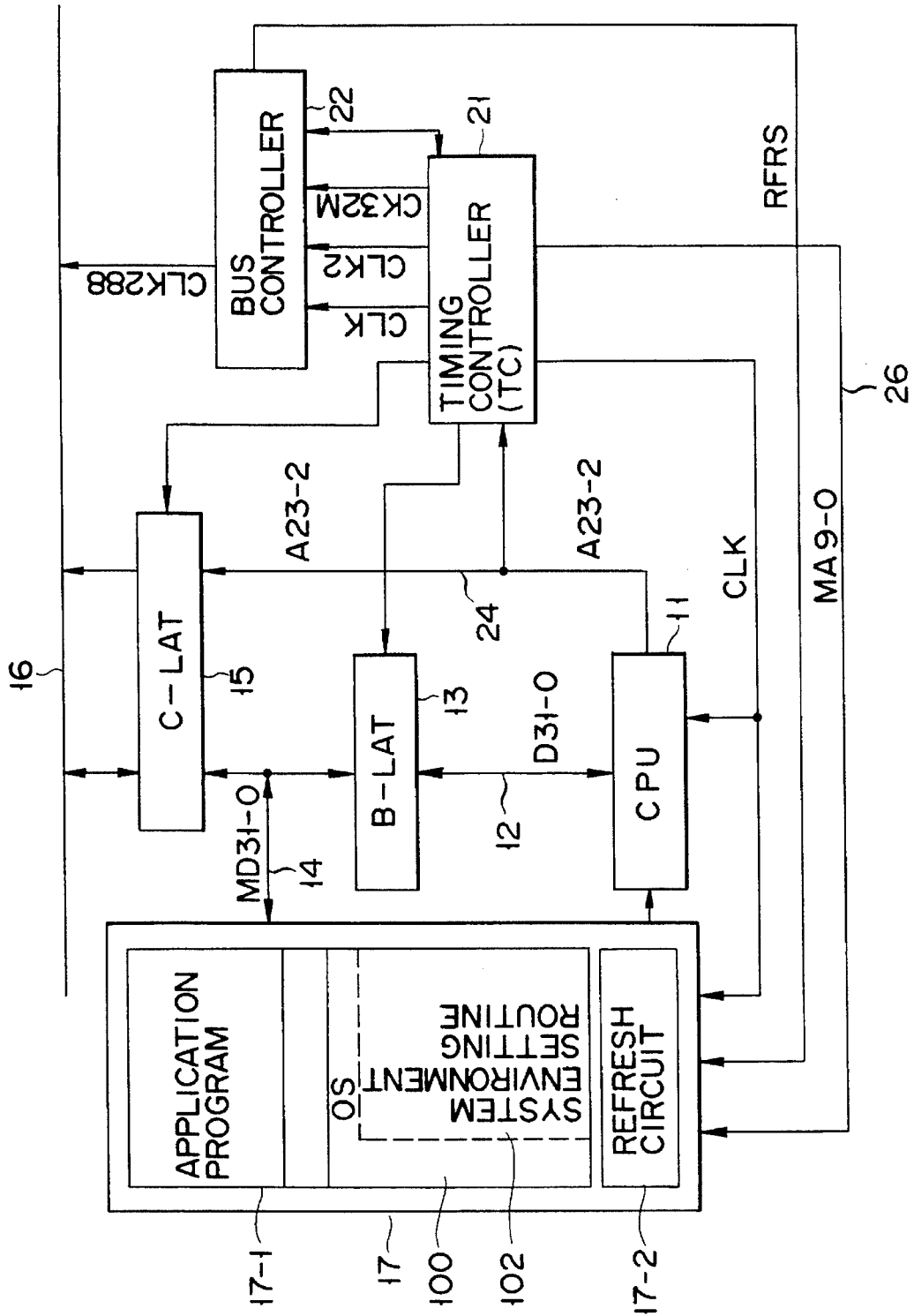
FIG. 2 is a block diagram showing the construction of a first embodiment of the computer system according to this invention.

Now, that portion of the construction of the computer system shown in FIG. 1 which relates to this invention is described in detail with reference to FIG. 2.

The memory section 17 is operated in synchronism with the input clock signal CLK and includes a memory 17-1 of 1 MB and a refresh circuit 17-2 for refreshing the memory 17-1. The storage area of the memory 17-1 includes an area for storing an operating system (OS) 100 and an area for storing an application program. A system environment setting routine 102 is contained in the OS 100. The memory section 17 outputs data specified by a column address (MA9-0) and a row address (MA9-0) on the memory address bus 26 to memory buses (MD31-0) 14. The refresh circuit 17-2 generates and outputs a hold request to the CPU 11 in response to an input refresh instruction RFRS and effects the refreshing operation for the memory 17-1.

The CPU 11 is operated in synchronism with the input clock signal CLK to output an address to the CPU address bus (A23-2) 24, receive data on the memory data buses (MD31-0) 14 via the latch (B-LAT) 13 and the CPU data buses (D31-0) 12 and output data to the memory buses MD31-0. The CPU 11 executes the system environment setting routine 102 in the operating system (OS) 100 in response to a system environment setting command input upon setting up of the computer system. In the routine 102, access control data is input and held. When the computer system is started upon normal use, the routine 102 is automatically executed and the held access control data is output the bus controller 22 via the B- and C-LATs 13 and 15. The application program in the memory 17-1 is executed by the CPU 11 under the control of the OS 100.

The B-LAT 13 latches data on the memory data bus 14 or the CPU data bus 12 in response to the timing control signal from the timing controller 21 and transfers the latched data to the CPU data bus 12 or the memory data bus 14. The C-LAT 15 latches data on the memory data bus 14 or the system data bus 16a in response to the timing control signal from the bus controller 22 and transfers the latched data to the CPU data bus 16a or the memory data bus 14. Also, at the same time, the C-LAT 15 latches an address on the CPU address bus 24 in response to the timing control signal from the bus controller 22 and transfers the latched address onto the system address bus 16b.

The timing controller 21 has a clock generator (not shown) provided therein and supplies a clock signal CLK2 of 40 MHz, a clock signal CLK of 20 MHz and a clock signal CK32M of 32 MHz to the bus controller 22. Further, the clock signal CLK is supplied to the CPU 11 and the memory section 17. The bus controller 22 receives the access control data from the CPU 11 and changes the operation clock frequency of the system bus 16 according to the frequency change bit in the access control data while the refresh operation is effected. The controller 22 also generates and outputs the refresh instruction signal RFRS to the memory section 17.

Figure 3:
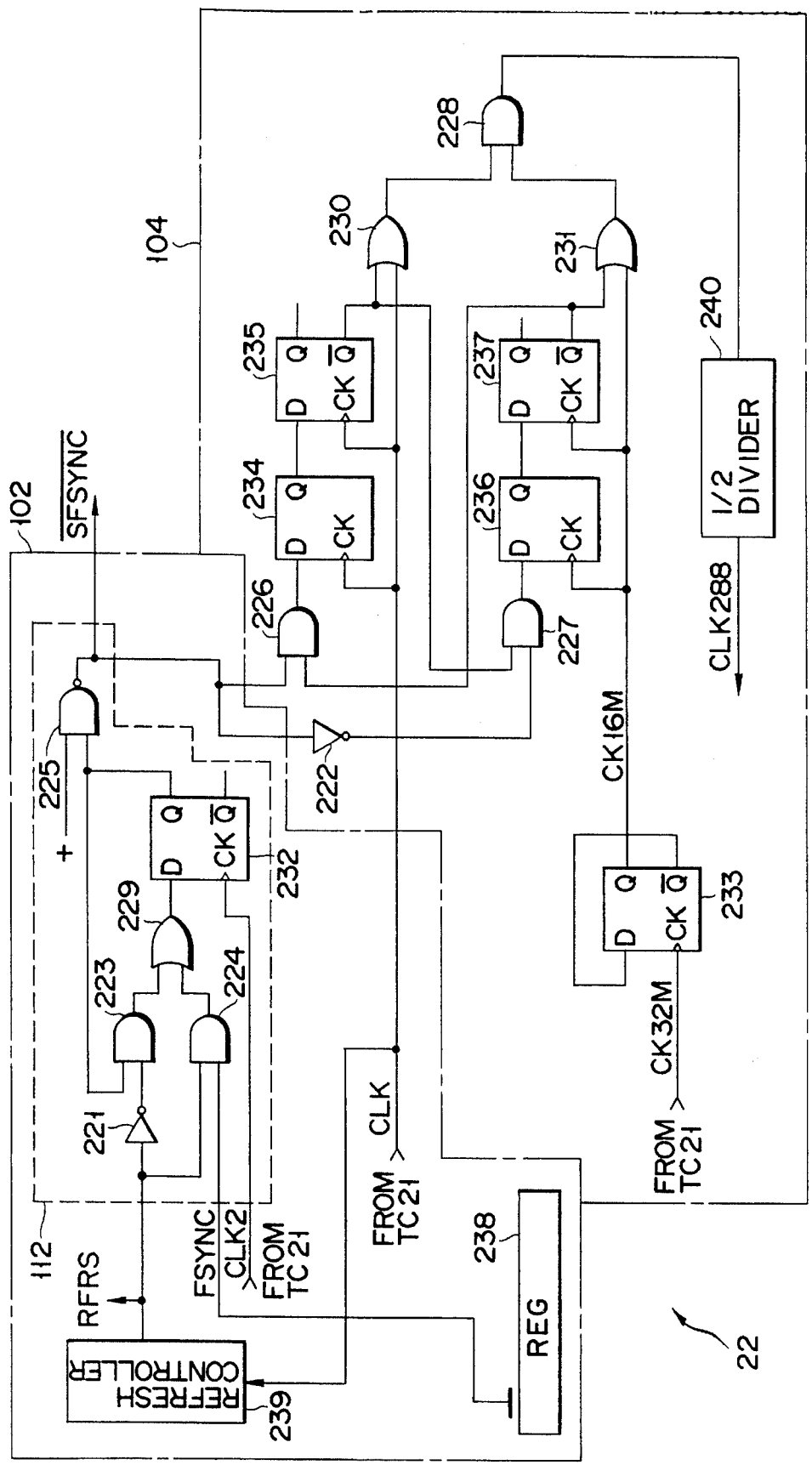
FIG. 3 is a block diagram showing the detailed construction of that portion of a bus controller of FIG. 2 which relates to this invention.

The detailed construction of the bus controller 22 is explained with reference to FIG. 3.

The bus controller 22 includes a refresh controller 239, an access control data register 238, inverters 221 and 222, AND gates 223 to 228, OR gates 229 to 231, D-type flip-flops (F/F) 232 to 237 and a ½ frequency divider 240. The inverter 221, AND gates 223, 224 and 225 and F/F 232 constitute a frequency change instruction generating section 112, and the refresh controller 239, the register 238 and the frequency change instruction generating section 112 constitute an instruction generator section 102. Further, the inverter 222, the AND gates 226 to 228, the F/Fs 234 to 237, the OR gates 230 and 231 and the frequency divider 240 constitute a frequency change section 104.

The refresh controller 239 generates a refresh instruction signal RFRS at a regular interval in response to the signal CLK from the timing controller 21 and supplies the refresh instruction signal RFRS to the inverter 221, the AND gate 224 and the refresh circuit 17-2 of the memory section 17. The register 238 receives access control data from the CPU 11 via the system bus 16 and holds the same therein. The format of the access control data is shown in FIG. 4. A sixth bit of the access control data is a data bit FSYNC which relates to this invention. The bit is set to a logic "0" when the system bus is to be operated at a frequency of 10 MHz and to a logic "1" when the system bus is to be operated at a frequency of 8 MHz. The other data bits have no relation to this invention and the explanation thereof is omitted. The bit data FSYNC is supplied to the AND gate 224.

The AND gate 223 receives an output of the inverter 221 and a Q output of the F/F 232 and supplies an output corresponding to the result of the logical AND operation to the OR gate 229. The AND gate 224 supplies an output corresponding to the logical product of the data bit SFSYNC held in the register 238 and the signal RFRS to the OR gate 229. An output of the OR gate 229 is supplied to the D input terminal of the F/F 232. The clock input terminal of the F/F 232 is supplied with the clock signal CLK2 of 40 MHz from the timing controller 21. A Q output of the F/F 232 is supplied to the AND gates 223 and 225. The other input terminal of the AND gate 225 is connected to a positive power source terminal.

The clock signal CLK of 20 MHz is supplied to the clock input terminals of the F/Fs 234 and 235 and to the OR gate 230. The signal $\overline{SFSYNC}$ is supplied to the AND gate 226 and the inverter 222. The AND gate 226 is further supplied with a $\overline{Q}$ output of the F/F 237. The AND gate 226 supplies an output corresponding to the logical product of the signal $\overline{\text{SFSYNC}}$ and the $\overline{Q}$ output of the F/F 237 to the D input terminal of the F/F 234. A $\overline{Q}$ output of the F/F 234 is supplied to the D input terminal of the F/F 235. A $\overline{Q}$ output of the F/F 235 is supplied to the OR gate 230 and AND gate 227. The OR gate 230 supplies an output corresponding to the logical sum of the $\overline{Q}$ output of the F/F 235 and the signal CLK to the AND gate 228.

The frequency of the clock signal CK32M of 32 MHz is divided into 16 MHz by the F/F 233 and then the clock signal is supplied to the clock input terminals of the F/Fs 236 and 237 and to the OR gate 231. An output of the inverter 222 is supplied to the AND gate 227. As described before, the AND gate 227 is supplied with the $\overline{Q}$ output of the F/F 235. The AND gate 227 supplies an output corresponding to the logical product of an inverted signal of the signal $\overline{\text{SFSYNC}}$ and the $\overline{Q}$ output of the F/F 235 to the D input terminal of the F/F 236 whose Q output is in turn supplied to the D input terminal of the F/F 237. A $\overline{Q}$ output of the F/F 237 is supplied to the OR gate 231 and AND gate 226. The OR gate 231 supplies an output corresponding to the logical sum of the $\overline{Q}$ output of the F/F 237 and the signal CK16M to the AND gate 228.

The AND gate 228 supplies an output corresponding to the logical product of the outputs of the OR gates 230 and 231 to the ½ frequency divider 240. The frequency divider 240 divides the frequency of an output signal of the AND gate 228 by 2 and supplies the (½)-divided frequency signal as a signal CLK288 to the system bus 16.

Now, the operation of the first embodiment of this invention is explained with reference to FIG. 5.

First, the power source is turned on to start up the computer system and the operating system (OS) 100 is started. When the system environment setting routine 102 in the OS 100 is executed, the access control data held therein is read out and is supplied from the CPU 11 to the bus controller 22 via the B-LAT 13 and C-LAT 15. As a result, the access control data is held in the register 238. The access control data is set and held in the system environment setting routine 102 when the computer system is set up and the routine 102 is executed in response to a system environment setting command input from a keyboard. When the system bus 16 is operated at a frequency of 10 MHz, the sixth data bit FSYNC of the access control data is set at the logic level "0". When the system bus 16 is operated at a frequency of 8 MHz, the sixth data bit FSYNC is set at the logic level "1".

When the bit FSYNC is at the logic level "0", the Q output of F/F 232 is set to the logic level "0" and the signal $\overline{\text{SFSYNC}}$ is set to the logic level "1". When the signal $\overline{\text{SFSYNC}}$ is set to the logic level "1", the $\overline{Q}$ output of the F/F 237 is set to the logic level "1" after one clock of the clock signal CK16M, i.e., at a time when the second clock is rising. Therefore, after one clock of the clock signal CLK, the $\overline{Q}$ output of the F/F 235 is set to the logic level "0". As a result, the clock signal CLK is supplied from the OR gate 230 to the AND gate 228. At this time, since an output of the OR gate 231 is set at the logic level "1", an output of the AND gate 228 becomes a clock signal of 20 MHz which is in turn divided by means of the frequency divider 240 to produce a clock signal of 10 MHz as a signal CLK288.

In a case where the operation clock of the system bus 16 is to be set to 8 MHz in the system environment setting routine 102, the access control data includes the bit FSYNC of logic "1". The access control data is supplied from the CPU 11 and set into the register 238. At this time, even if the $\overline{Q}$ output of the F/F 232 is set at the logic "0", the $\overline{Q}$ output of the F/F 232 is always set to the logic level "1" if an instruction signal RFRS of logic "1" is generated from the refresh controller 239 as shown in FIG. 5. Then, the Q output of the F/F 232 is kept set at the logic "1". As a result, the signal $\overline{\text{SFSYNC}}$ is set to the logic "0" as shown in FIG. 5.

Even if the $\overline{Q}$ output of the F/F 235 is set at the logic level "0", when the signal $\overline{\text{SFSYNC}}$ is set to the logic level "0", the $\overline{Q}$ output of the F/F 235 is set to the logic level "1" after one clock of the clock signal CLK since the $\overline{Q}$ output of the F/F 237 is set at the logic "1". At this time, since the $\overline{Q}$ output of the F/F 237 is kept set at the logic "1", two input signals of the logic level "1" are supplied to the AND gate 228. As a result, as shown in FIG. 5, an output of the AND gate is kept set at the logic "1". Further, when the signal $\overline{\text{SFSYNC}}$ is set at the logic "0", the $\overline{Q}$ output of the F/F 237 is set to the logic level "0" after one clock of the signal CK16M when the $\overline{Q}$ output of the F/F 235 has been set to the logic level "1". Therefore, the OR gate 231 permits the clock signal CK16M to pass therethrough. As a result, as shown in FIG. 5, the clock signal appears again. The clock signal is the signal CK16M and is divided by means of the frequency divider 240 and supplied to the system bus 16 as a clock signal of 8 MHz.

As described above, in the first embodiment, the frequency of the operation clock of the system bus can be programmatically set to the frequency which is set in the system environment setting routine at the time of starting up the system.

Figure 6:
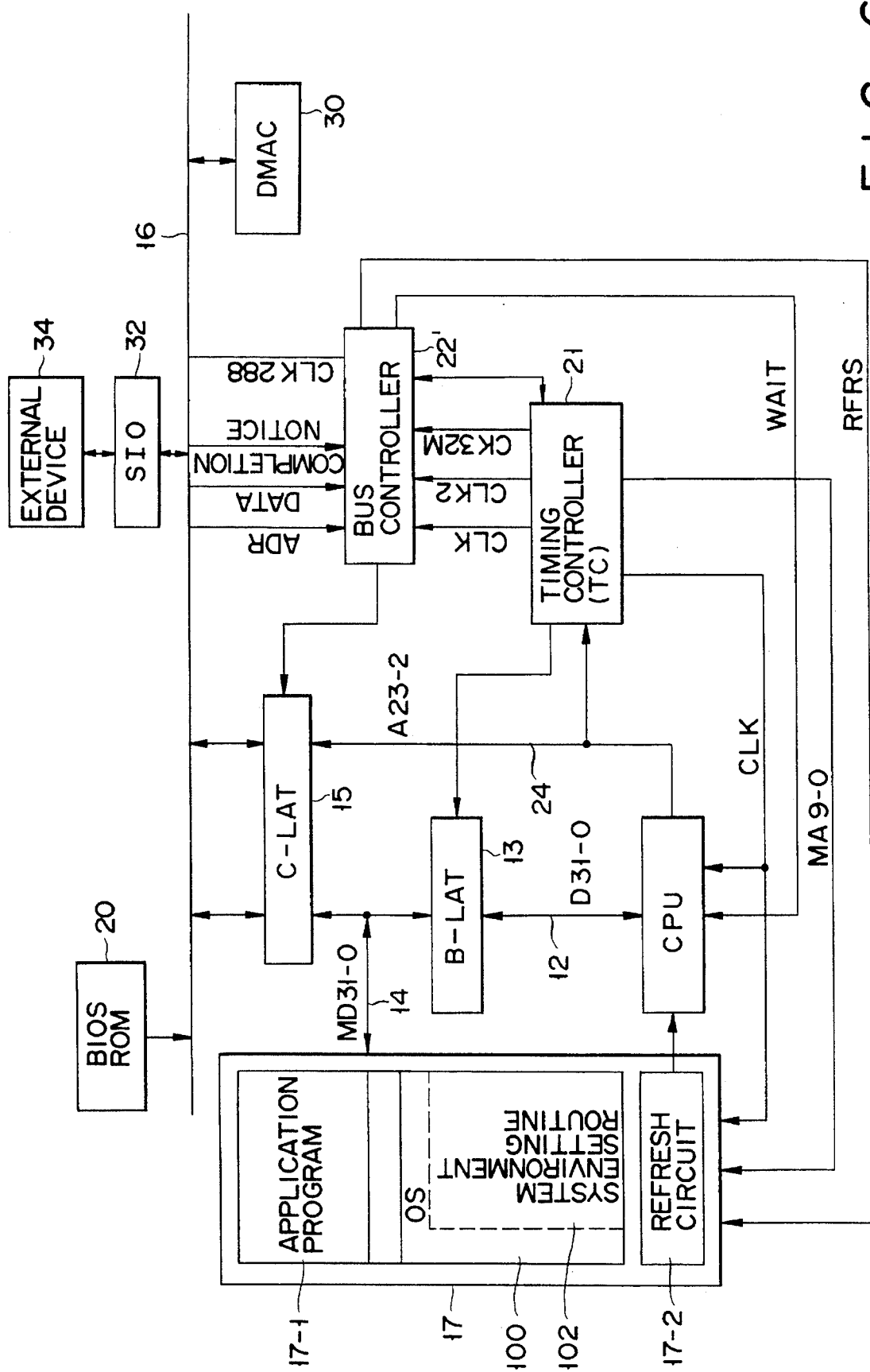
FIG. 6 is a block diagram showing the construction of a second embodiment of the computer system according to this invention.

Now, the construction of the second embodiment of this invention is explained with reference to FIG. 6.

Since the second embodiment is similar to the first embodiment, only that portion of the second embodiment which is different from the first embodiment is explained. Assume that a CPU 11 transfers data to an external device 34 via an interface 32 which can be operated only at a low clock frequency while the application program is executed. When the CPU 11 executes an output command in the application program for the interface 32, the CPU 11 generates and supplies an output instruction to a Direct Memory Access Controller (DMAC) 30 according to a basic input/output system program stored in the BIOS ROM 20. The DMAC 30 reads out data from a memory section 17 in response to the output instruction and transfers the read-out data to the external device 34 via the interface 32. When all the data is completely transferred, the DMAC 30 generates a completion notice to the CPU 11. A bus controller 22' monitors the output instruction from the CPU 11 to the DMAC 30 and the completion notice from the DMAC 30 to the CPU 11, and programmatically sets the operation clock frequency of the system bus from 10 MHz to 8 MHz. When detecting the output instruction to the interface 32 the bus controller 22' changes the operation clock frequency of the system bus 16 to 8 MHz and maintains the frequency of 8 MHz until the completion notice is input from the DMAC 30. While the operation clock frequency is changed, there is a possibility that a next command will be executed since the CPU 11 executes commands of the application program in a pipeline fashion. At this time, in order to prevent the next command from being executed, a WAIT signal is supplied from the bus controller 22' to the CPU 11 so as to set the CPU 11 into the wait state.

Next, the construction of the bus controller 22' is explained with reference to FIG. 7. As shown in FIG. 7, the bus controller 22' includes an address comparator 250, a decoder 252, a J–K flip-flop (F/F) 254 and an AND gate 225 in order to generate a signal $\overline{\text{SFSYNC}}$. The address comparator 250, the decoder 252, the F/F 254 and the AND gate 225 constitute an instruction generator section 106.

The address comparator 250 receives an address on the system address bus 16b and compares the received address with held addresses to determined whether the received address coincides one of the held addresses. The held address is predetermined in the system environment setting routine 102 when the computer system is set up and is supplied to the comparator 250 upon start of the computer system. When a coincidence is obtained, e.g., when it is determined that the received address coincided with an address of the DMAC 30, the address comparator 250 outputs a control signal to the decoder 252. The decoder 252 receives and decodes data or the output instruction on the system data bus 16a in response to the control signal from the comparator 250 and checks whether it is an input instruction an output instruction.

When the received data is the output instruction to the DMAC 30, the decoder 252 supplies a signal of the logic "1" to the J-terminal of the F/F 254. As a result, the Q output of the F/F 254 is set to the logic "1" and at the same time the signal $\overline{\text{SFSYNC}}$ is set to the logic "0".

Then, the same operation is effected as in the first embodiment, and the operation clock of the system bus 16 is changed to 8 MHz. A WAIT signal generator 256 generates a signal WAIT, which is sent to the CPU 11 for inhibiting the operation of the CPU 11 for a predetermined period of time in response to the signal $\overline{\text{SFSYNC}}$.

Thereafter, when all the data has been transferred, the DMAC 30 supplies the completion notice to the CPU 11. The completion notice is also supplied to the K terminal of the F/F 254 and the F/F 254 is reset, thus setting the Q output of the F/F 254 to the logic level "0". As a result, the system bus 16 is operated at the frequency of 10 MHz again. The timings in the above explanation are the same as those shown in FIG. 5.

As described above, in the second embodiment, since the frequency of the operation clock of the system bus is automatically changed to a lower frequency only when the interface having a low operation rate is accessed while the application program is executed. Therefore, the average operation speed of the system can be maintained high.

It is possible to specify the I/O interface which necessitates change of the frequency of the operation clock of the system bus in the system environment setting routine and set the address thereof into the address comparator. And, in the above embodiment, only the output instruction is described but the input instruction is similar.

What is claimed is:

1. A computer system comprising:
   a system bus operating at one of a first operation clock frequency and a second operation clock frequency, the first operation clock frequency being higher than the second operation
   an input/output device connected to said system bus and operating only at the second operation clock frequency;
   processor means, connected to said system bus, for supplying an input/output instruction;
   access control means, connected to said system bus, for performing data transfer with said input/output device in response to the input/output instruction, and for supplying a completion notice to said processor means when the data transfer is completely performed; and
   bus control means for operating said system bus to set the second operation clock frequency in response to the input/output instruction, and for operating said system bus to set the first operation clock frequency in response to the completion notice.

2. A computer system comprising:
   a system bus operating at one of a first operation clock frequency and a second operation clock frequency, the first operation clock frequency being higher than the second operation clock frequency;
   an input/output device connected to said system bus and operating only at the second operation clock frequency;
   a central processing unit (CPU), connected to said system bus, for supplying an input/output instruction;
   a direct memory access controller (DMAC), connected to said system bus, for performing data transfer with said input/output device in response to the input/output instruction, and for supplying a completion notice to said CPU when the data transfer is completely performed; and
   a bus controller for operating said system bus to set the second operation clock frequency in response to the input/output instruction, and operating said system bus to set the first operation clock frequency in response to the completion notice.

3. A computer system comprising:
   a system bus operating at one of a first operation clock frequency and a second operation clock frequency, the first operation clock frequency being higher than the second operation clock frequency;
   an input/output device connected to said system bus and operating only at the second operation clock frequency;
   memory means, connected to said system bus, for storing data;
   processor means, connected to said system bus, for supplying an output instruction;
   access control means, connected to said system bus, for reading out data from said memory means in response to the output instruction and transferring the read-out data to said input/output device, and for supplying a completion notice to said processor means when all the data is completely transferred; and
   bus control means for operating said system bus to set the second operation clock frequency in response to the output instruction, and operating said system bus to set the first operation clock frequency in response to the completion notice.

4. A computer system comprising:
   a system bus operating at one of a first operation clock frequency and a second operation clock frequency, the first operation clock frequency being higher than the second operation clock frequency;
   an input/output device connected to said system bus and operating only at the second operation clock frequency;
   memory means, connected to said system bus, for storing data;
   a central processing unit (CPU), connected to said system bus, for supplying an output instruction;
   a direct memory access controller (DMAC), connected to said system bus, for reading out data from said memory means in response to the output instruction and transferring the read-out data to said input/output device, and for supplying a completion notice to said CPU when all the data is completely transferred; and
   a bus controller for operating said system bus to set the second operation clock frequency in response to the output instruction, and operating said system bus to set the first operation clock frequency in response to the completion notice.

* * * * *

UNITED STATES PATENT AND TRADEMARK OFFICE
CERTIFICATE OF CORRECTION

PATENT NO. : 5,546,567
DATED : August 13, 1996
INVENTOR(S) : Nobutaka NAKAMURA

It is certified that error appears in the above-indentified patent and that said Letters Patent is hereby corrected as shown below:

Claim 1, column 7, line 53, after "operation", insert --clock frequency;--.

Signed and Sealed this

Twenty-second Day of July, 1997

Attest:

BRUCE LEHMAN

Attesting Officer

Commissioner of Patents and Trademarks